Aug. 25, 1936.   F. M. YOUNG ET AL   2,051,930
ELECTRIC HEATING UNIT
Filed Feb. 9, 1935

Inventors
Fred M. Young
Ernst Witzel
By A. S. Krotz
   attorney

Patented Aug. 25, 1936

2,051,930

UNITED STATES PATENT OFFICE 2,051,930

ELECTRIC HEATING UNIT

Fred M. Young and Ernst Witzel, Racine, Wis., assignors to Young Radiator Company, Racine, Wis.

Application February 9, 1935, Serial No. 5,785

1 Claim. (Cl. 201—64)

It is the intention that the present patent shall cover by suitable expression in the appended claim, features of patentable novelty other than claimed in our patent No. 1,998,916, issued April 23, 1935, the present patent being a continuation in part thereof.

Our invention relates to means for heating an air current wherein the resister is enclosed in a suitably shaped metal container and insulated therefrom preferably by means of a refractory material.

Our invention further relates to means for greatly increasing the radiating surface by means of closely spaced fins similar to what is commonly used in radiators or heat transfer devices of various kinds.

The object of our invention is to provide the following: a container which protects the resister, a structure which may be manufactured and shipped in large quantities, and is adapted to be conveniently assembled in units and may be variously connected in series or multiple so as to be adaptable to various voltages, and further to be practically indestructible and highly efficient.

To these and other useful ends our invention consists in matter hereinafter set forth and claimed and shown in the accompanying drawing in which:

Figure 5:
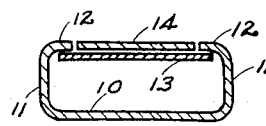
Figure 5 is a transverse section of the casing only, taken on line 3—3 of Figure 2.

As thus illustrated our improved electric heating unit consists of a housing which is preferably rectangular in cross section, as shown in Figure 5. Thus we provide a suitable enclosing means for the resister and its insulating material and a suitable support for the radiating fins, as will hereinafter appear.

Figure 2:
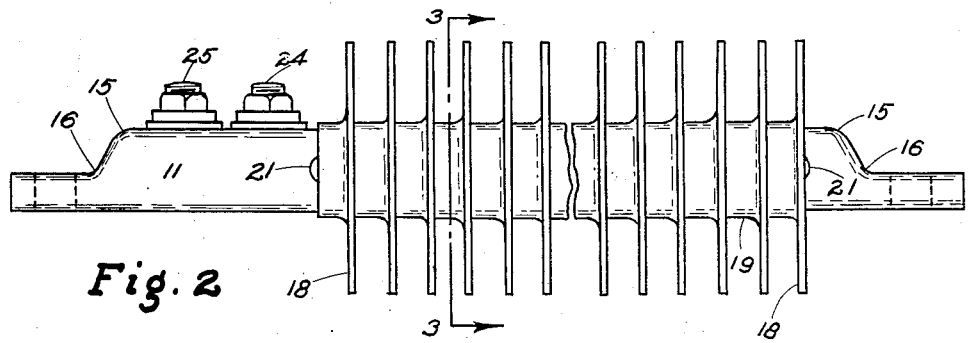
Figure 2 is a fractional front view of the unit shown in Figure 1.

The housing comprises a U shaped channel having a base 10 and side members 11—11, each side member having inwardly extending narrow members 12—12, thus forming a flanged trough which may be rolled or pressed from sheet steel. The closure member 13 is preferably flat and of a width to thereby fit under members 12, preferably for the full length of the trough. The resister and its insulating material and closure 13 are inserted into position in the trough thus forming a tube, the ends of which are preferably bent on one side as at 15 and 16, thus to form short flattened ends as clearly indicated in Figure 2, providing a closed container having means with which to mount the unit on any suitable support. Orifices 17 are provided whereby the units may be removably attached to their supports.

Figure 3:
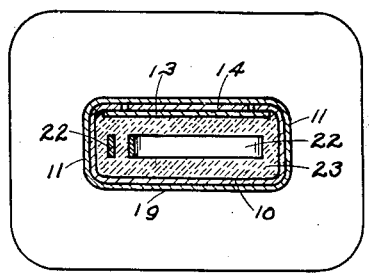
Figure 3 is a transverse sectional view taken on line 3—3 of Figure 2.
Figure 4:
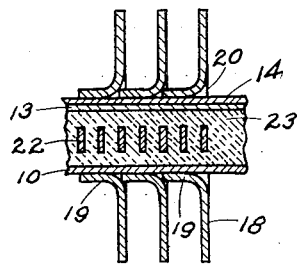
Figure 4 is a sectional view taken on line 4—4 of Figure 1.

Clearly it would be difficult to properly position and insulate the resister in a one piece tube. Applicants, therefore, provide a trough as shown in Figure 5, and closure member 13 therefor. The resister 22 is made from suitable material having preferably, the form of a ribbon as illustrated in Figures 3 and 4. This ribbon is folded back and forth so as to provide the necessary length. The folds are made somewhat shorter than the width of the space provided in the enclosure, thus to leave room for the return end of the resister and a suitable thickness of the insulating material 23, as illustrated in Figures 3 and 4.

Figure 1:
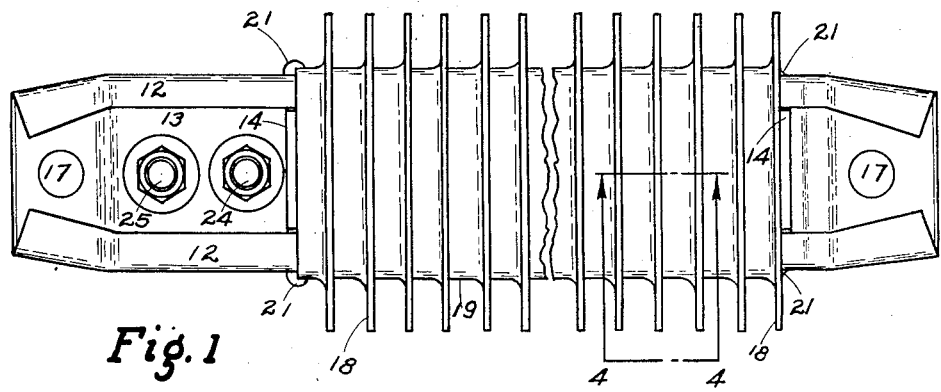
Figure 1 is a fractional side view of our improved heating unit.

The ends of the resister 22 are attached to the inner ends of bolts 24 and 25, these bolts being suitably insulated from the closure 13 and preferably positioned as indicated. We may, however, elect to place these connections on opposite ends of the unit, in which case the fins will be positioned differently than shown in Figures 1 and 2.

We provide means for increasing the radiating surface of the housing as follows: a plate 14 is adapted to fit between the ends of members 12 and be in direct contact with closure 13 and having the same thickness as members 12; thus we provide a continuous, smooth, rectangular surface upon which to mount our radiating fins which are designated by reference character 18, having flanges 19 which are made to tightly embrace the housing and act as spacers for the fins. The fins are pressed tightly together on the housing and thus the ends of the sleeves will pass into the curved openings 20 and be caused thereby to press more tightly into the housing at these ends. While under this end pressure, the two end fins are welded to the housing as at 21—21; thus the assembly is made permanent and the fins held tightly in spaced relation on the housing. Each fin is provided with a large area flange contact with the housing, whereby when air is moved between the tubes and fins, excessive heat in the resister will be avoided because it will be readily transferred from the fins to the air by conduction.

Clearly the fin flanges cannot be bonded to the housing as in radiators. Therefore, we provide simple and inexpensive means for supplying a suitable housing and large area fins and flanges therefor, through which to conduct heat from the interior of the housing to the circulating air. The necessity for applicants' design is caused by the fact that high temperatures are created in the resisters and unless large heat radiating and conducting means are provided, the resisters would eventually be destroyed. Applicants' fin flanges and housing surface must therefore, be large and tightly fitted and so held permanently, the principal object being to reduce the overall size of the containing chamber and provide a strong, neat, low cost and efficient unit, adaptable to the many and varying requirements of installations, voltages and conditions of exposure. Applicants' unit is adapted to be positioned in a row across the air passage of a unit heater with the flat sides transverse to the direction of air flow and the fin edges preferably in juxtaposition, thus providing adequate area in the form of narrow and long air passages as is the custom in modern heat transfer devices commonly called radiators.

Figure 6:
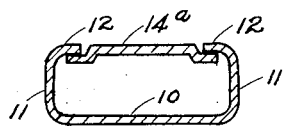
Figure 6 is a modification.

Clearly other means than shown for closing the ends of the housing and the open side of the trough may be employed. The closure 14ª (see Figure 6), may be sharply offset at its edges whereby the space between the ends of members 12 is filled, thus leaving a smooth outer surface without the use of the two members shown in Figure 5; or member 14 may be an integral part of 13 or spot welded thereto, the object being to provide a suitable closure having a smooth outer surface which registers with the outer surfaces of members 12—12 for contact with the fin flanges.

Having thus shown and described our invention we claim:

An electric heating unit of the class described, comprising a metal trough rectangular in cross section, the open side of which is provided with narrow inwardly projecting flanges, a metal plate fitting under said flanges cooperating with said trough to form the inside wall of a housing, a metal filler strip positioned on the outside surface of said plate having the same thickness as said flanges and a width to thereby fill the space between the edges of said flanges, whereby to form a smooth outer surface on the flange side of said housing, a multiplicity of spaced fins having at their centers flanged openings through which said housing extends, said fin flanges closely embracing the outside walls of said housing and said strip, a resister having suitable outlet connections positioned in said housing and equispaced from the inside walls thereof by means of a suitable insulating material.

FRED M. YOUNG.
ERNST WITZEL.